United States Patent
Cai

(10) Patent No.: US 12,524,443 B2
(45) Date of Patent: Jan. 13, 2026

(54) LOG INFORMATION PROCESSING METHOD, DEVICE AND STORAGE MEDIUM

(71) Applicant: Beijing Volcano Engine Technology Co., Ltd., Beijing (CN)

(72) Inventor: Shu Cai, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/781,914

(22) Filed: Jul. 23, 2024

(65) Prior Publication Data

US 2025/0068652 A1    Feb. 27, 2025

(30) Foreign Application Priority Data

Aug. 25, 2023    (CN) .......................... 202311091057.2

(51) Int. Cl.
  *G06F 16/28*   (2019.01)
  *G06F 16/22*   (2019.01)
  *G06F 16/2455* (2019.01)

(52) U.S. Cl.
  CPC ........ *G06F 16/285* (2019.01); *G06F 16/2272* (2019.01); *G06F 16/2455* (2019.01)

(58) Field of Classification Search
  None
  See application file for complete search history.

(56) References Cited

U.S. PATENT DOCUMENTS

| 9,069,571 B2 * | 6/2015 | Fried ...................... G06F 16/152 |
| 10,078,865 B2 * | 9/2018 | Joshi ...................... G06F 3/0484 |
| 10,387,255 B2 * | 8/2019 | Zeng .................... G06F 11/1076 |

(Continued)

FOREIGN PATENT DOCUMENTS

| CN | 112527735 A | 3/2021 |
| CN | 113535711 A | 10/2021 |

(Continued)

OTHER PUBLICATIONS

European Patent Application No. 24189844.4; Extended Search Report; dated Jan. 9, 2025; 9 pages.

(Continued)

*Primary Examiner* — Debbie M Le
(74) *Attorney, Agent, or Firm* — BakerHostetler

(57) ABSTRACT

The embodiments of the present disclosure provide a log information processing method and apparatus, a device and a storage medium, the method is applied to a distributed log storage system, the distributed log storage system includes a log writing cluster and a plurality of log storage clusters, and the method includes: in response to any writing node among a plurality of writing nodes included in the log writing cluster receiving log information, acquiring a storage partition identifier in the log information by the writing node; determining cluster configuration information corresponding to the storage partition identifier by the writing node, in which the cluster configuration information includes a log storage cluster identifier; and determining a target log storage cluster matched with the log storage cluster identifier from the plurality of log storage clusters by the writing node, and writing the log information into the target log storage cluster.

20 Claims, 3 Drawing Sheets

(56) References Cited

U.S. PATENT DOCUMENTS

| | | | |
|---|---|---|---|
| 11,640,261 B2* | 5/2023 | Lu | G06F 3/0604 |
| | | | 711/154 |
| 11,914,571 B1* | 2/2024 | Bao | G06F 16/1734 |
| 2016/0110408 A1 | 4/2016 | Madhavarapu et al. | |
| 2018/0063218 A1 | 3/2018 | Kim et al. | |
| 2024/0330344 A1* | 10/2024 | Oikarinen | G06F 11/3476 |

FOREIGN PATENT DOCUMENTS

| | | | |
|---|---|---|---|
| CN | 113722276 A | 11/2021 | |
| CN | 113760847 A | 12/2021 | |
| CN | 113886434 A | 1/2022 | |
| CN | 114398520 A | 4/2022 | |
| CN | 114428763 A | 5/2022 | |
| CN | 115328702 A | 11/2022 | |

OTHER PUBLICATIONS

China Patent Application No. 202311091057.2; Office Action; dated May 13, 2025; 12 pages.
Yang et al.; "The Design of High Performance Massive Data Query System Based on K/V Index"; Computer Engineering & Software; vol. 37 No. 3; 2016; p. 79-83 (contains English Abstract).
China Patent Application No. 202311091057.2; Office Action; dated Sep. 19, 2025; 12 pages.
Pei Xiandong et al.; "Cloud Computing: Open Source Technology and Practice"; Northwestern Polytechnical University Press Sian; 2020; p. 86-88 (English Translation).

* cited by examiner

LOG INFORMATION PROCESSING METHOD, DEVICE AND STORAGE MEDIUM

CROSS-REFERENCE TO RELATED APPLICATION

The present application claims the priority of Chinese patent application No. 202311091057.2 filed on Aug. 25, 2023, and the disclosure of the above-mentioned Chinese patent application is hereby incorporated in its entirety as a part of the present application.

TECHNICAL FIELD

Embodiments of the present disclosure relate to a log information processing method and apparatus, a device and a storage medium.

BACKGROUND

With the development of Internet technology, more and more users watch videos and buy things through Internet platforms. It is necessary to store log information of a user. For example, the information of a certain order from the user can be recorded to obtain the log information. The log information is stored so that the user can learn the real-time status of the order by querying the log information.

In the prior art, the log information of the user is stored by an ElasticSearch database. The ElasticSearch database stores the log information in a form of a data list, upon the log information being received, the number of the log information in the data list is determined first, and then the log information is stored in a list position corresponding to the number.

However, the inventors have found that the prior art has at least the following technical problems: the writing speed of the ElasticSearch database is unstable and is greatly affected by the amount of log information; in this way, upon the amount of the log information is large, the writing speed of the ElasticSearch database is slow, which leads to a low storage efficiency of the log information.

SUMMARY

The embodiments of the present disclosure provide a log information processing method and apparatus, a device and a storage medium, which can improve the storage efficiency of log information.

The embodiments of the present disclosure provide a log information processing method, which is applied to a distributed log storage system, the distributed log storage system includes a log writing cluster and a plurality of log storage clusters; and the method includes:
  in response to any writing node among a plurality of writing nodes included in the log writing cluster receiving log information, acquiring a storage partition identifier in the log information by the writing node;
  determining cluster configuration information corresponding to the storage partition identifier by the writing node, in which the cluster configuration information includes a log storage cluster identifier; and
  determining a target log storage cluster matched with the log storage cluster identifier from the plurality of log storage clusters by the writing node, and writing the log information into the target log storage cluster.

The embodiments of the present disclosure provide a log information processing apparatus, which is applied to a distributed log storage system, in which the distributed log storage system includes a log writing cluster and a plurality of log storage clusters; and the apparatus includes:
  an acquiring module, configured to, in response to any writing node among a plurality of writing nodes included in the log writing cluster receiving log information, acquire a storage partition identifier in the log information by the writing node;
  a determining module, configured to determine cluster configuration information corresponding to the storage partition identifier by the writing node, in which the cluster configuration information includes a log storage cluster identifier; and
  a writing module, configured to determine a target log storage cluster matched with the log storage cluster identifier from the plurality of log storage clusters by the writing node, and write the log information into the target log storage cluster.

The embodiments of the present disclosure provide an electronic device, which includes a processor, and a memory in communication connection with the processor;
  the memory stores a computer-executable instruction;
  the processor executes the computer-executable instruction stored in the memory to implement the log information processing method according to any one of the above embodiments.

The embodiments of the present disclosure provide a computer-readable storage medium, the computer-readable storage medium stores a computer-executable instruction, and upon a processor executing the computer-executable instruction, the processor implements the log information processing method according to any one of the above embodiments.

The embodiments of the present disclosure provide a computer program product, which includes a computer program, upon the computer program being executed by a processor, the computer program implements the log information processing method according to any one of the above embodiments.

BRIEF DESCRIPTION OF DRAWINGS

To describe the technical solutions in the embodiments of the present disclosure or in the prior art more clearly, the accompanying drawings required in the description of the embodiments or the prior art will be described briefly below, apparently, the accompanying drawings in the following description are some embodiments of the present disclosure, other accompanying drawings can also be obtained according to these drawings without creative labor by those ordinarily skilled in the art.

DETAILED DESCRIPTION

Figure 1:
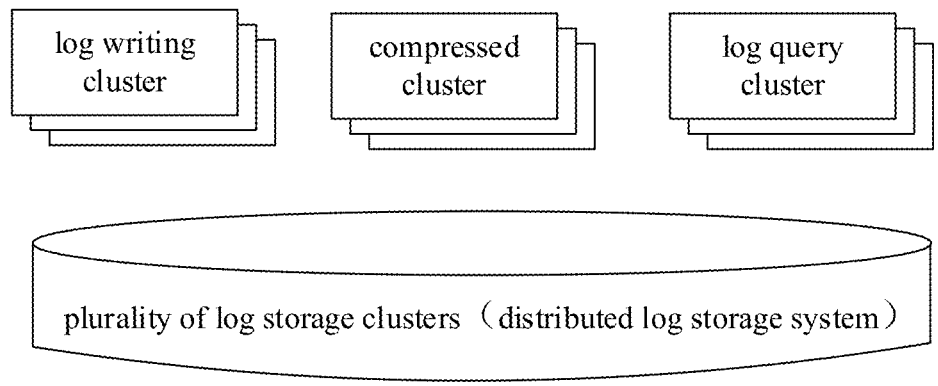
FIG. 1 is a schematic diagram of an application scenario of a log information processing method provided by an embodiment of the present disclosure.

In order to make the purpose, technical scheme and advantages of the embodiment of the present disclosure clearer, the technical schemes in the embodiments of the present disclosure will be described clearly and completely with the accompanying drawings, obviously, the described embodiments are a part of the embodiments of the present disclosure, but not all embodiments. Based on the embodiments of the present disclosure, all other embodiments obtained by those ordinarily skilled in the art without creative labor belong to the protection scope of the present disclosure.

It should be noted that the user information (including but not limited to user device information, user personal information, etc.) and data (including but not limited to data for analysis, stored data, displayed data, etc.) involved in the present disclosure are all information and data authorized by users or fully authorized by all parties, and the collection, using and processing of relevant data need to comply with relevant laws, regulations and standards, and corresponding operation portals are provided for users to choose authorization or rejection.

With the development of Internet technology, more and more users watch videos and buy things through Internet platforms. It is necessary to store log information of a user. For example, the information of a certain order from the user can be recorded to obtain the log information. The log information is stored so that the user can learn the real-time status of the order by querying the log information.

In the prior art, the log information of the user is stored by an ElasticSearch database. The ElasticSearch database stores the log information in a form of a data list, upon the log information being received, the number of the log information in the data list is determined first, and then the log information is stored in a list position corresponding to the number. However, the writing speed of the ElasticSearch database is unstable and is greatly affected by the amount of log information; in this way, upon the amount of the log information is large, the writing speed of the ElasticSearch database is slow, which leads to a low storage efficiency of the log information.

It can be seen that how to improve the writing speed of the log information to improve the storage efficiency of the log information is a technical problem that needs to be solved urgently at present.

In order to solve the above problems, the present embodiment provides the following technical ideas: the log information can be stored by a distributed log storage system, the distributed log storage system includes a log writing cluster and a plurality of log storage clusters; the log writing cluster and the plurality of log storage clusters are relatively independent. The log writing cluster can process the writing of the log independently. Specific implementation steps include: in response to any writing node among a plurality of writing nodes included in the log writing cluster receiving log information, acquiring a storage partition identifier in the log information by the writing node; determining cluster configuration information corresponding to the storage partition identifier by the writing node, in which the cluster configuration information includes a log storage cluster identifier; and determining a target log storage cluster matched with the log storage cluster identifier from the plurality of log storage clusters by the writing node, and writing the log information into the target log storage cluster. Because the log writing cluster is only configured to process the writing of the log information without storing the log information, the efficiency of writing the log information is improved, and the daily writing magnitude of the log information is further increased.

The application scenarios of the embodiments of the present disclosure are explained below.

The log information processing method according to the embodiments of the present disclosure can be applied to a scenario where any log information of a user is stored. FIG. 1 is a schematic diagram of an application scenario of a log information processing method provided by an embodiment of the present disclosure. As illustrated in FIG. 1, the log information processing method can be applied to a distributed log storage system, the distributed log storage system includes a log writing cluster and a plurality of log storage clusters (also referred to as a distributed file system). The log writing cluster and the distributed file system are independent of each other, and the log writing cluster can be connected to the log storage cluster through wired method or wireless method to implement a transmission of the log data. Upon the log writing cluster receiving the log information, the log information is written to the distributed file system. Because the log writing cluster is only configured to process the writing of the log information without storing the log information, the efficiency of writing the log information is improved, and the daily writing magnitude of the log information is further increased. The log information processing method according to the embodiments of the present disclosure will be described in detail below by detailed embodiments.

Figure 2:
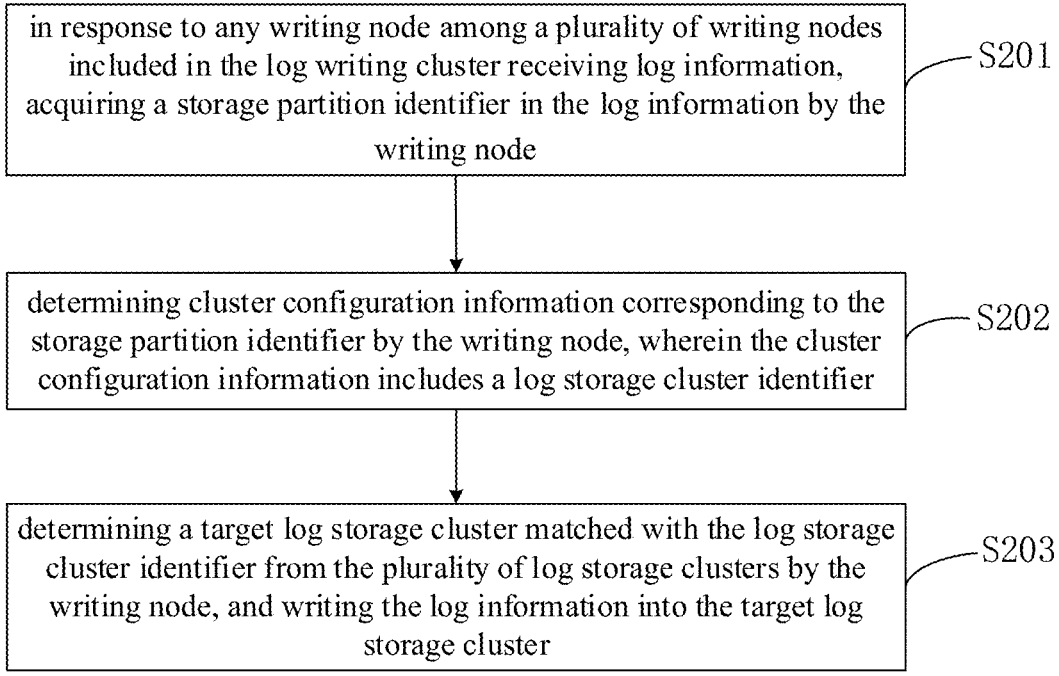
FIG. 2 is a flowchart of a log information processing method provided by an embodiment of the present disclosure.

FIG. 2 is a flowchart of a log information processing method provided by an embodiment of the present disclosure. The method can be applied to a distributed log storage system, the distributed log storage system includes a log writing cluster and a plurality of log storage clusters. As illustrated in FIG. 2, the method includes the following steps.

S201, in response to any writing node among a plurality of writing nodes included in the log writing cluster receiving log information, acquiring a storage partition identifier in the log information by the writing node.

In the embodiments of the present disclosure, the writing node may be a computer device for processing log information, and a plurality of computer devices form a log writing cluster. Each writing node can receive the log information through the Thrift protocol. The log information may be transaction record information or operation record information executed by the user through a terminal. For example, the log information may be a transaction record executed by a user 1 through a terminal A. The terminal A may send the log information to the writing node through the Thrift protocol. As an example, the writing node can be expressed in Ingester. The log information can be expressed in codec.

Alternatively, the log information may further carry a storage partition identifier. Correspondingly, the writing node can acquire the storage partition identifier in the log information from a preset field of the log information.

S202, determining cluster configuration information corresponding to the storage partition identifier by the writing node, in which the cluster configuration information includes a log storage cluster identifier.

In the embodiments of the present disclosure, the writing node stores a corresponding relationship between the storage partition identifier and the cluster configuration information. Correspondingly, the present step includes: determining the cluster configuration information corresponding to the storage partition identifier from the corresponding relationship between the storage partition identifier and the cluster configuration information by the writing node. The cluster configuration information can be expressed in LogSet.

It should be noted that the attribute information of the cluster configuration information may include a log storage cluster identifier. For example, upon LogSet1 including a log storage cluster identifier as a storage cluster 1, the log information is stored in the storage cluster 1 by LogSet1.

Alternatively, the configuration information of the cluster configuration information includes a TTL of the cluster configuration information and an index list of the cluster configuration information. The TTL of the cluster configuration information is configured to specify how many days the log information is stored, and expired data will be automatically cleared. The index list of the cluster configuration information is configured to specify which keynames in the log information can support an establishment of inverted indexes or word segmentation indexes, upon the log information being written, these fields are automatically indexed to accelerate a query of the log information. In the embodiments of the present disclosure, the configuration information of the cluster configuration information can be set according to user requirements.

S203, determining the cluster configuration information corresponding to the storage partition identifier from the corresponding relationship between the storage partition identifier and the cluster configuration information by the writing node.

In the embodiments of the present disclosure, the cluster configuration information includes a log storage cluster identifier. The writing node determines a target log storage cluster matched with the log storage cluster identifier from the plurality of log storage clusters through the log storage cluster identifier.

As an example, the cluster configuration information LogSet1 includes a log storage cluster identifier as the storage cluster 1. Correspondingly, the present step includes: determining a target log storage cluster matched with the storage cluster 1 from the plurality of log storage clusters through the log storage cluster identifier (the storage cluster 1) by the writing node, and writing the log information into the target log storage cluster.

It should be noted that the writing node has a log writing speed greater than a preset writing threshold. In the embodiments of the present disclosure, the value of the preset writing threshold is not specifically limited. Here, because the writing node has high-performance writing processing capability, the writing of the log information can be processed quickly, thereby improving the efficiency of writing the log information and increasing the daily writing magnitude of the log.

The log storage cluster may include a plurality of storage nodes, the storage nodes are configured to store the log information, and a requirement for the writing processing capability is low, that is, a configuration requirement of the storage node can be reduced, thereby reducing a cost of the log storage cluster.

Figure 3:
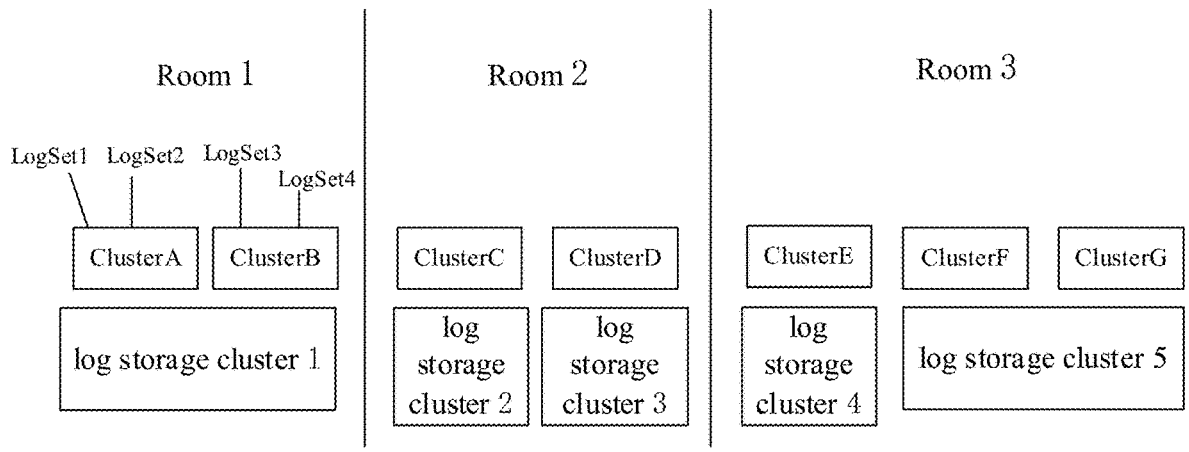
FIG. 3 is a schematic diagram of a layout of a plurality of log storage clusters provided by an embodiment of the present disclosure.

It should be noted that the plurality of log storage clusters can be placed through a plurality of rooms. Alternatively, the plurality of log storage clusters are arranged in different device rooms, and one device room is arranged with one or more log storage clusters. As an example, as illustrated in FIG. 3, the plurality of device rooms include room 1, room 2, and room 3. A log storage cluster 1 is installed in the room 1, a log storage cluster 2 and a log storage cluster 3 are installed in the room 2, and a log storage cluster 4 and a log storage cluster 5 are installed in the room 3.

In one embodiment of the present disclosure, the storage partition identifier includes a service identifier. The cluster configuration information corresponding to one or more services can be stored in a physical cluster. The physical cluster can be expressed in Cluster. A log storage cluster can correspond to one or more physical clusters.

As an example, as illustrated in FIG. 3, the log storage cluster 1 corresponds to a physical cluster ClusterA and a physical cluster ClusterB. The log storage cluster 1 may store log information of service A, service B, service C, and service D. Cluster configuration information LogSet1 corresponding to the service A and cluster configuration information LogSet2 corresponding to the service B can be stored in the physical cluster ClusterA. The log information of the service A and the service B is stored in the log storage cluster 1 by the ClusterA. Cluster configuration information LogSet3 corresponding to the service C and cluster configuration information LogSet4 corresponding to the service D can be stored in the physical cluster ClusterB. The log information of the service C and the service D is stored in the log storage cluster 1 by the ClusterB.

Referring to FIG. 3, the log storage cluster 2 corresponds to a physical cluster ClusterC, the log storage cluster 3 corresponds to a physical cluster ClusterD, the log storage cluster 4 corresponds to a physical cluster ClusterE, and the log storage cluster 5 corresponds to a physical cluster ClusterF and a physical cluster ClusterG.

Here, because a plurality of log storage clusters are placed through a plurality of rooms, and the plurality of rooms are independent of each other, upon a certain room failing, the log storage clusters in other rooms will not be affected. Moreover, the reading and writing of the log storage cluster are all in the local room, in this way, the reading and writing performance of the log storage cluster is high. Moreover, the writing traffic will not go across the room, thereby saving the traffic bandwidth across the room and saving a special line traffic cost.

The log information processing method according to the embodiment includes: in response to any writing node among a plurality of writing nodes included in the log writing cluster receiving log information, acquiring a storage partition identifier in the log information by the writing node; determining cluster configuration information corresponding to the storage partition identifier by the writing node, in which the cluster configuration information includes a log storage cluster identifier; and determining a target log storage cluster matched with the log storage cluster identifier from the plurality of log storage clusters by the writing node, and writing the log information into the target log storage cluster. Because the log writing cluster and the log storage cluster are relatively independent clusters, the log writing cluster can only process the writing of the log information without storing the log information, so that the efficiency of writing the log information is improved; moreover, because the log storage cluster is only configured to store the log information without processing the log information, the configuration requirement of the log storage cluster can be reduced, thereby reducing the cost of the log storage cluster.

Figure 4:
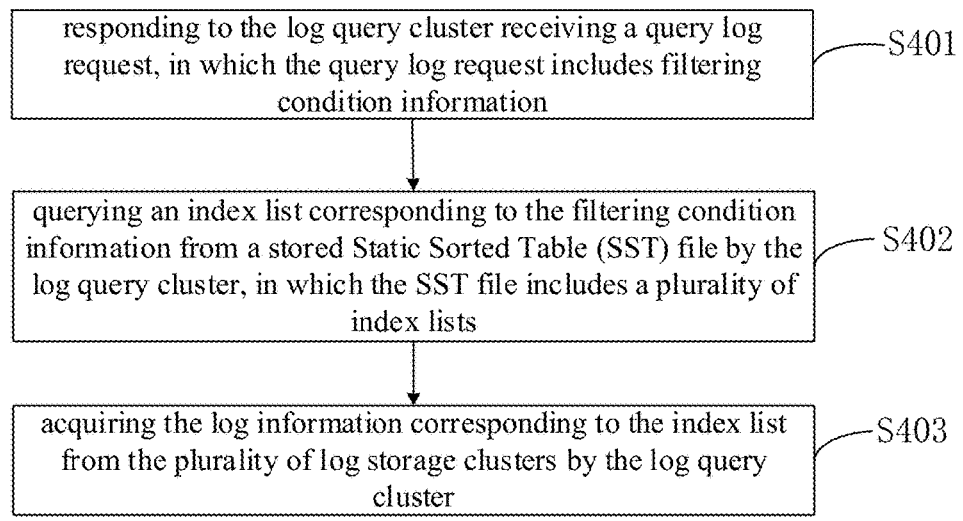
FIG. 4 is a flowchart of another log information processing method provided by an embodiment of the present disclosure.

FIG. 4 is a flowchart of a log information processing method provided by an embodiment of the present disclosure. The distributed log storage system further includes a log query cluster (refer to FIG. 1). Certain log information can be queried from the plurality of log storage clusters by the log query cluster. As illustrated in FIG. 4, the method specifically includes the following steps.

S401, responding to the log query cluster receiving a query log request, in which the query log request includes filtering condition information.

In the embodiments of the present disclosure, the filtering condition information may include a search keyword. As an example, the query log request includes a search keyword "hello". The filtering condition information may further include search range information, for example, a data expiry date.

S402, querying an index list corresponding to the filtering condition information from a stored Static Sorted Table (SST) file by the log query cluster, in which the SST file includes a plurality of index lists.

Alternatively, the filtering condition information includes a search keyword and/or a data expiry date, correspondingly, the present step includes: querying the index list corresponding to the search keyword from the stored static sorted table file by the log query cluster; and/or, querying the index list corresponding to the data expiry date from the stored static sorted table file by the log query cluster.

It should be noted that, as illustrated in FIG. 1, the log query cluster and the log writing cluster are independent of each other and deployed on different physical devices. The log writing cluster writes the log information through a writing thread, and the log query cluster queries the log information through a query thread. The writing thread and the query thread are relatively independent, so that the log query cluster and the log writing cluster do not interfere with each other.

In some embodiments of the present disclosure, as illustrated in FIG. 1, the distributed log storage system further includes a compression cluster, and the cluster configuration information further includes a preset keyname (i.e. the index list of the cluster configuration information in S202). Correspondingly, before querying the index list corresponding to the filtering condition information from the stored static sorted table file by the log query cluster, the method further includes: extracting the preset keyname from the log information by the compression cluster, and generating the index list corresponding to the log information according to the preset keyname; and merging the index list corresponding to a preset number of log information by the compression cluster to obtain the SST file. The compression cluster can be expressed in compactor.

It should be noted that the distributed log storage system includes a plurality of compression clusters, and in the process of generating the SST file by the plurality of compression clusters, the load of each compression cluster can be allocated by a load balancing node. Alternatively, the load balancing node can be expressed in Master.

Correspondingly, the distributed log storage system further includes a load balancing node. Specific steps of allocating the load of each compression cluster by the load balancing node include: acquiring load information of each of a plurality of compressed nodes included in the compression cluster by the load balancing node, wherein the load information includes the number of log information of the index list to be generated; transferring the log information of the index list to be generated in the compressed node of which load information is greater than a first preset load to the compressed node of which load information is less than a second preset load by the load balancing node; in which the first preset load is greater than the second preset load.

In the embodiments of the present disclosure, the first preset load indicates that the number of log information of the index list to be generated is a first preset number; and the second preset load indicates that the number of log information of the index list to be generated is a second preset number. The values of the first preset number and the second preset number can be set and modified according to requirements.

S403, acquiring the log information corresponding to the index list from the plurality of log storage clusters by the log query cluster.

Here, the log query cluster and the log writing cluster are independent of each other and deployed on different physical devices. The log query cluster and the log writing cluster do not interfere with each other, that is, the log writing cluster only processes the writing of the log information, and the log query cluster only processes the query of the log information, so that the efficiency of writing the log information and the efficiency of querying the log information are improved.

Figure 5:
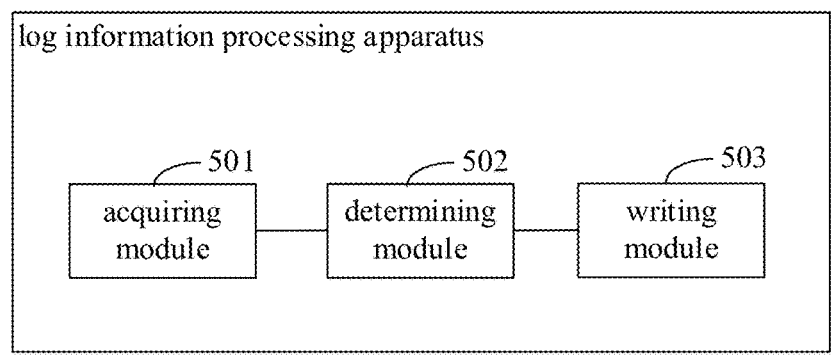
FIG. 5 is a structural block diagram of a log information processing apparatus provided by an embodiment of the present disclosure.

FIG. 5 is a structural block diagram of a log information processing apparatus provided by an embodiment of the present disclosure. An apparatus of processing log information is provided, which is applied to a distributed log storage system, the distributed log storage system includes a log writing cluster and a plurality of log storage clusters. Referring to FIG. 5, the log information processing apparatus includes an acquiring module 501, a determining module 502, and a writing module 503.

The acquiring module 501 is configured to, in response to any writing node among a plurality of writing nodes included in the log writing cluster receiving log information, acquire a storage partition identifier in the log information by the writing node;

the determining module 502 is configured to determine cluster configuration information corresponding to the storage partition identifier by the writing node, the cluster configuration information includes a log storage cluster identifier;

the writing module 503 is configured to determine a target log storage cluster matched with the log storage cluster identifier from the plurality of log storage clusters by the writing node, and write the log information into the target log storage cluster.

According to one or more embodiments of the present disclosure, the writing node stores a corresponding relationship between the storage partition identifier and the cluster configuration information. Correspondingly, the determining module 502, determining the cluster configuration information corresponding to the storage partition identifier by the writing node, specifically includes: determining the cluster configuration information corresponding to the storage partition identifier from the corresponding relationship between the storage partition identifier and the cluster configuration information by the writing node.

According to one or more embodiments of the present disclosure, the storage partition identifier includes a service identifier.

According to one or more embodiments of the present disclosure, a log writing speed of the writing node is greater than a preset writing threshold.

According to one or more embodiments of the present disclosure, the distributed log storage system further includes a log query cluster; the apparatus further includes:

a query module; the query module is configured to: respond to the log query cluster receiving a query log request, in which the query log request includes filtering condition information; query an index list corresponding to the filtering condition information from a stored Static Sorted Table (SST) file by the log query cluster, in which the SST file includes a plurality of index lists; and acquire the log information corresponding to the index list from the plurality of log storage clusters by the log query cluster.

According to one or more embodiments of the present disclosure, the filtering condition information includes a search keyword and/or a data expiry date. Correspondingly, the query module querying the index list corresponding to the filtering condition information from the stored SST file by the log query cluster, specifically includes: querying the index list corresponding to the search keyword from the stored SST file by the log query cluster, and/or, querying the index list corresponding to the data expiry date from the stored SST file by the log query cluster.

According to one or more embodiments of the present disclosure, the distributed log storage system further includes a compression cluster, and the cluster configuration information further includes a preset keyname. The apparatus further includes: a compression module; the compression module is configured to extract the preset keyname from the log information by the compression cluster, and generate the index list corresponding to the log information according to the preset keyname; and merge the index list corresponding to a preset number of log information by the compression cluster to obtain the SST file.

According to one or more embodiments of the present disclosure, the distributed log storage system further includes a load balancing node. The apparatus further includes: a load balancing module. The load balancing module is configured to acquire load information of each of a plurality of compressed nodes included in the compression cluster by the load balancing node, in which the load information includes the number of log information of the index list to be generated; and transfer the log information of the index list to be generated in the compressed node of which load information is greater than a first preset load to the compressed node of which load information is less than a second preset load by the load balancing node; the first preset load is greater than the second preset load.

According to one or more embodiments of the present disclosure, the plurality of log storage clusters are arranged in different device rooms, and one device room is arranged with one or more log storage clusters.

The acquiring module 501, the determining module 502, and the writing module 503 are connected in sequence. The log information processing apparatus provided by the present embodiment can execute the technical scheme of the method embodiments described above, and its implementation principle and technical effect are similar, which will not be described in detail in the present embodiment.

Figure 6:
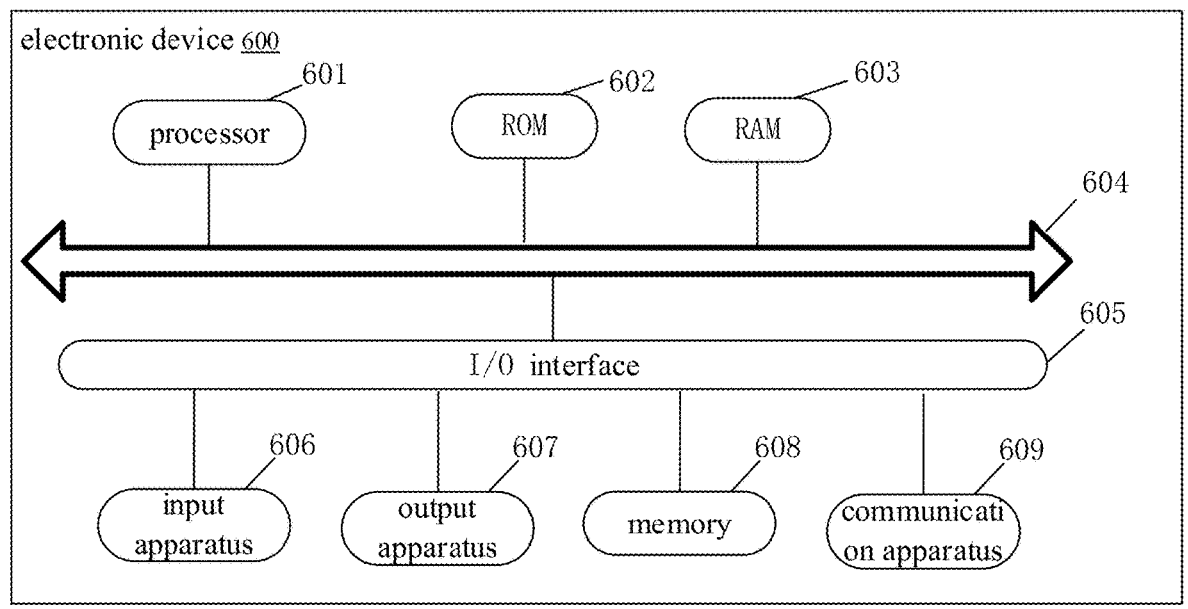
FIG. 6 is a schematic diagram of a hardware structure of an electronic device provided by an embodiment of the present disclosure.

FIG. 6 is a schematic diagram of a hardware structure of an electronic device provided by an embodiment of the present disclosure. Referring to FIG. 6, the electronic device 600 may be a terminal device or a server. The terminal device may include, but is not limited to, a mobile terminal such as a mobile phone, a notebook computer, a digital broadcasting receiver, a personal digital assistant (PDA), a portable Android device (PAD), a portable media player (PMP), a vehicle-mounted terminal (for example, a vehicle-mounted navigation terminal) and so on, and a fixed terminal such as a digital TV, a desktop computer and so on. The electronic device illustrated in the FIG. 6 is only an example, and should not pose any limitation to the functions and the scope of use of the embodiments of the present disclosure.

As illustrated in FIG. 6, the electronic device 600 may include a processor (for example, a central processor, a graphics processor, and so on) 601 that may execute various appropriate actions and processes according to a program stored in a read only memory (ROM) 602 or a program loaded from a random access memory (RAM) 603 from a memory 608. In the RAM 603, various programs and data required for the operation of the electronic device 600 are further stored. The processor 601, the ROM 602 and the RAM 603 are interconnected by a bus 604. An input/output (I/O) interface 605 is also connected to the bus 604.

Generally, the following devices may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a loudspeaker, a vibrator, etc.; a memory 608 including, for example, a magnetic tape, a hard disk, etc.; and a communication apparatus 609. The communication apparatus 609 may allow the electronic device 600 to perform wireless or wired communication with other devices to exchange data. While the electronic device 600 with various devices is illustrated in FIG. 6, it should be understood that it is not required to implement or have all the apparatuses illustrated. It may implement alternatively or possess the more or less apparatuses.

In particular, according to the embodiments of the present disclosure, the processes described above with reference to the flowcharts may be implemented as a computer software program. For example, an embodiment of the present disclosure includes a computer program product, which includes a computer program carried by a computer-readable medium, the computer program includes program codes for performing the method illustrated in the flowchart. In such an embodiment, the computer program may be downloaded and installed from a network through the communication apparatus 609, or installed from the memory 608, or installed from the ROM 602. Upon the computer program being executed by the processor 601, the above-mentioned functions defined in the method of the embodiments of the present disclosure are performed.

It should be noted that the computer-readable medium mentioned above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, device or device, or any combination thereof. More specific examples of the computer-readable storage medium may include, but not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above. In the present disclosure, the computer-readable storage medium may be any tangible medium containing or storing a program that may be used by or in combination with an instruction execution system, device or device. In the present disclosure, the computer-readable signal medium may include a data signal propagated in a baseband or as a part of a carrier wave, in which computer-readable program codes are carried. This propagated data signal may take multiple forms, including but not limited to an electromagnetic signal, an optical signal or any suitable combination of the above. The computer-readable signal medium may also be any computer-readable medium other than the computer-readable storage medium, and may send, propagate or transmit a program used by or in combination with an instruction execution system, an apparatus or a device. The program codes contained on the computer-readable medium may be transmitted by any suitable medium, including but not limited to: an electric wire, a fiber-optic cable, radio frequency (RF) and so on, or any suitable combination of the above.

The computer-readable medium described above may be included in the above-mentioned electronic device; or it may exist alone without being assembled into the electronic device.

The computer-readable medium carries one or more programs, that, upon being executed by the electronic device, cause the electronic device to perform the method illustrated in the above embodiments.

Computer program codes for performing the operations of the present disclosure may be written in one or more programming languages or a combination thereof, the programming languages include object-oriented programming languages such as Java, Smalltalk and C++, and further include conventional procedural programming languages such as "C" programming language or similar programming languages. The program codes may be entirely executed on a user's computer, partially executed on the user's computer, executed as an independent software package, partially executed on the user's computer and partially executed on a remote computer, or entirely executed on the remote computer or a server. In the case involving a remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate the architecture, function and operation of possible implementations of the systems, methods and the computer program product according to various embodiments of the present disclosure. In this regard, each block in the flowcharts or block diagrams may represent a module, a program segment, or a part of codes, which includes one or more executable instructions for implementing specified logical functions. It should also be noted that, in some alternative implementations, the functions noted in the blocks may occur out of the order noted in the accompanying drawings. For example, two blocks illustrated in succession may, in fact, be executed substantially in parallel, and may sometimes be executed in a reverse order, depending on the function involved. It should also be noted that, each block in the block diagrams and/or flowcharts, and combinations of blocks in the block diagrams and/or flow diagrams, may be implemented by a dedicated hardware-based system that performs specified functions or operations, or by a combination of dedicated hardware and computer instructions.

The units involved in the embodiments described in the present disclosure may be implemented by software or hardware. Among them, the name of the unit does not constitute a limitation on the unit itself in some cases.

The functions described above herein may be at least partially performed by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logic device (CPLD) and so on.

In the context of the present disclosure, the machine-readable medium may be a tangible medium that may include or store a program used by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In a first aspect, according to one or more embodiments of the present disclosure, a log information processing method is provided, which is applied to a distributed log storage system, in which the distributed log storage system includes a log writing cluster and a plurality of log storage clusters; the method includes:

in response to any writing node among a plurality of writing nodes included in the log writing cluster receiving log information, acquiring a storage partition identifier in the log information by the writing node;

determining cluster configuration information corresponding to the storage partition identifier by the writing node, in which the cluster configuration information includes a log storage cluster identifier; and determining a target log storage cluster matched with the log storage cluster identifier from the plurality of log storage clusters by the writing node, and writing the log information into the target log storage cluster.

According to one or more embodiments of the present disclosure, the writing node stores a corresponding relationship between the storage partition identifier and the cluster configuration information; correspondingly, determining the cluster configuration information corresponding to the storage partition identifier by the writing node includes: determining the cluster configuration information corresponding to the storage partition identifier from the corresponding relationship between the storage partition identifier and the cluster configuration information by the writing node.

According to one or more embodiments of the present disclosure, the storage partition identifier includes a service identifier.

According to one or more embodiments of the present disclosure, the writing node has a log writing speed greater than a preset writing threshold.

According to one or more embodiments of the present disclosure, the distributed log storage system further includes a log query cluster, and the method further includes: responding the log query cluster receiving a query log request, in which the query log request includes filtering condition information; querying an index list corresponding to the filtering condition information from a stored static sorted table file by the log query cluster, in which the SST file includes a plurality of index lists; and acquiring the log information corresponding to the index list from the plurality of log storage clusters by the log query cluster.

According to one or more embodiments of the present disclosure, the filtering condition information includes a search keyword and/or a data expiry date; accordingly, the querying an index list corresponding to the filtering condition information from a stored static sorted table file by the log query cluster, includes: querying the index list corresponding to the search keyword from the stored static sorted table file by the log query cluster; and/or, querying the index list corresponding to the data expiry date from the stored static sorted table file by the log query cluster.

According to one or more embodiments of the present disclosure, the distributed log storage system further includes a compression cluster, and the cluster configuration information further includes a preset keyname; before querying the index list corresponding to the filtering condition information from the stored static sorted table file by the log query cluster, the method further includes: extracting the preset keyname from the log information by the compression cluster, and generating the index list corresponding to the log information according to the preset keyname; and merging the index list corresponding to a preset number of log information by the compression cluster to obtain the stored static sorted table file.

According to one or more embodiments of the present disclosure, the distributed log storage system further includes a load balancing node, and the method further includes: acquiring load information of each of a plurality of compressed nodes included in the compression cluster by the load balancing node, in which the load information includes the number of log information of the index list to be generated; transferring the log information of the index list to be generated in the compressed node of which load information is greater than a first preset load to the compressed node of which load information is less than a second preset load by the load balancing node; in which the first preset load is greater than the second preset load.

According to one or more embodiments of the present disclosure, the plurality of log storage clusters are arranged in different device rooms, and one device room is arranged with one or more log storage clusters.

In a second aspect, according to one or more embodiments of the present disclosure, a log information processing apparatus is provided, which is applied to a distributed log storage system, the distributed log storage system includes a log writing cluster and a plurality of log storage clusters; and the apparatus includes:
- an acquiring module, configured to, in response to any writing node among a plurality of writing nodes included in the log writing cluster receiving log information, acquire a storage partition identifier in the log information by the writing node;
- a determining module, configured to determine cluster configuration information corresponding to the storage partition identifier by the writing node, wherein the cluster configuration information includes a log storage cluster identifier; and
- a writing module, configured to determine a target log storage cluster matched with the log storage cluster identifier from the plurality of log storage clusters by the writing node, and write the log information into the target log storage cluster.

According to one or more embodiments of the present disclosure, the writing node stores a corresponding relationship between the storage partition identifier and the cluster configuration information; correspondingly, the determining module, determining the cluster configuration information corresponding to the storage partition identifier by the writing node, specifically includes: determining the cluster configuration information corresponding to the storage partition identifier from the corresponding relationship between the storage partition identifier and the cluster configuration information by the writing node.

According to one or more embodiments of the present disclosure, the storage partition identifier includes a service identifier.

According to one or more embodiments of the present disclosure, a log writing speed of the writing node is greater than a preset writing threshold.

According to one or more embodiments of the present disclosure, the distributed log storage system further includes a log query cluster; the apparatus further includes: a query module; the query module is configured to: respond to the log query cluster receiving a query log request, in which the query log request includes filtering condition information; query an index list corresponding to the filtering condition information from a stored Static Sorted Table (SST) file by the log query cluster, in which the SST file includes a plurality of index lists; and acquire the log information corresponding to the index list from the plurality of log storage clusters by the log query cluster.

According to one or more embodiments of the present disclosure, the filtering condition information includes a search keyword and/or a data expiry date. Correspondingly, the query module querying the index list corresponding to the filtering condition information from a stored SST file by the log query cluster, specifically includes: querying the index list corresponding to the search keyword from the stored SST file by the log query cluster, and/or, querying the index list corresponding to the data expiry date from the stored SST file by the log query cluster.

According to one or more embodiments of the present disclosure, the distributed log storage system further includes a compression cluster, and the cluster configuration information further includes a preset keyname; the apparatus further includes: a compression module; the compression module is configured to extract the preset keyname from the log information by the compression cluster, and generate the index list corresponding to the log information according to the preset keyname; and merge the index list corresponding to a preset number of log information by the compression cluster to obtain the SST file.

According to one or more embodiments of the present disclosure, the distributed log storage system further includes a load balancing node, the apparatus further includes: a load balancing module, the load balancing module is configured to acquire load information of each of a plurality of compressed nodes included in the compression cluster by the load balancing node, in which the load information includes the number of log information of the index list to be generated; and transfer the log information of the index list to be generated in the compressed node of which load information is greater than a first preset load to the compressed node of which load information is less than a second preset load by the load balancing node; the first preset load is greater than the second preset load.

According to one or more embodiments of the present disclosure, the plurality of log storage clusters are arranged in different device rooms, and one device room is arranged with one or more log storage clusters.

In a third aspect, according to one or more embodiments of the present disclosure, an electronic device is provided, which includes a processor, and a memory in communication connection with the processor;
the memory stores a computer-executable instruction;

the processor executes the computer-executable instruction stored in the memory to implement the log information processing method as described in the first aspect and various possible designs of the first aspect.

In a fourth aspect, according to one or more embodiments of the present disclosure, a computer-readable storage medium is provided, the computer-readable storage medium stores a computer-executable instruction, and upon a processor executing the computer-executable instruction, the processor implements the log information processing method as described in the first aspect and various possible designs of the first aspect.

In a fifth aspect, the embodiments of the present disclosure provide a computer program product, which includes a computer program, upon the computer program being executed by a processor, the computer program implements the log information processing method as described in the first aspect and various possible designs of the first aspect.

The description above is merely the preferred embodiments of the present disclosure and illustrative of the principles of the technology employed. It should be understood by those skilled in the art that the disclosure scope involved in the present disclosure is not limited to the technical solution formed by the specific combination of the above technical features, but also covers other technical solutions formed by any combination of the above technical features or their equivalent features without departing from the concept of the above disclosure, for example, technical solution that formed by replacing the above features with the technical features with similar functions disclosed in this disclosure (but not limited to).

Furthermore, although various operations are depicted in a particular order, this should not be understood as requiring that these operations be performed in the particular order illustrated or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A log information processing method, comprising:
   receiving log information by any writing node among a plurality of writing nodes comprised in a log writing cluster of a distributed log storage system, wherein the distributed log storage system further comprises a plurality of log storage clusters, and each of the plurality of log storage clusters has a corresponding log storage cluster identifier;
   acquiring a storage partition identifier in the log information by the writing node, wherein the writing node stores a corresponding relationship between storage partition identifiers and cluster configuration information, and the cluster configuration information comprises log storage cluster identifiers;
   determining a log storage cluster identifier corresponding to the storage partition identifier by the writing node;
   determining a target log storage cluster from the plurality of log storage clusters based on the log storage cluster identifier by the writing node; and
   writing the log information into the target log storage cluster.

2. The method according to claim 1, wherein the determining a log storage cluster identifier corresponding to the storage partition identifier by the writing node comprises:
   determining the log storage cluster identifier corresponding to the storage partition identifier based on the corresponding relationship stored in the writing node.

3. The method according to claim 1, wherein the distributed log storage system further comprises a log query cluster, and the method further comprises:
   responding the log query cluster receiving a query log request, wherein the query log request comprises filtering condition information;
   querying an index list corresponding to the filtering condition information from a stored static sorted table file by the log query cluster, wherein the static sorted table file comprises a plurality of index lists; and
   acquiring the log information corresponding to the index list from the plurality of log storage clusters by the log query cluster.

4. The method according to claim 3, wherein the filtering condition information comprises a search keyword and/or a data expiry date;
   correspondingly, querying the index list corresponding to the filtering condition information from the stored static sorted table file by the log query cluster, comprises:
   querying the index list corresponding to the search keyword from the stored static sorted table file by the log query cluster; and/or, querying the index list corresponding to the data expiry date from the stored static sorted table file by the log query cluster.

5. The method according to claim 3, wherein the distributed log storage system further comprises a compression cluster, and the cluster configuration information further comprises a preset keyname;
   before querying the index list corresponding to the filtering condition information from the stored static sorted table file by the log query cluster, the method further comprises:
   extracting the preset keyname from the log information by the compression cluster, and generating the index list corresponding to the log information according to the preset keyname; and
   merging the index list corresponding to a preset number of log information by the compression cluster to obtain the stored static sorted table file.

6. The method according to claim 5, wherein the distributed log storage system further comprises a load balancing node, and the method further comprises:
   acquiring load information of each of a plurality of compressed nodes comprised in the compression cluster by the load balancing node, wherein the load information comprises the number of log information of the index list to be generated;
   transferring the log information of the index list to be generated in the compressed node of which load information is greater than a first preset load to the compressed node of which load information is less than a second preset load by the load balancing node;
   wherein the first preset load is greater than the second preset load.

7. The method according to claim 1, wherein the plurality of log storage clusters are arranged in different device rooms, and of the device rooms is arranged with one or more log storage clusters.

8. An electronic device, comprising a processor, and a memory in communication connection with the processor; wherein the memory stores a computer-executable instruction; the processor executes the computer-executable instruction stored in the memory to implement operations, the operations comprising:

receiving log information by any writing node among a plurality of writing nodes comprised in a log writing cluster of a distributed log storage system, wherein the distributed log storage system further comprises a plurality of log storage clusters, and each of the plurality of log storage clusters has a corresponding log storage cluster identifier;

acquiring a storage partition identifier in the log information by the writing node, wherein the writing node stores a corresponding relationship between storage partition identifiers and cluster configuration information, and the cluster configuration information comprises log storage cluster identifiers;

determining a log storage cluster identifier corresponding to the storage partition identifier by the writing node;

determining a target log storage cluster from the plurality of log storage clusters based on the log storage cluster identifier by the writing node; and writing the log information into the target log storage cluster.

9. The electronic device according to claim 8, wherein the determining a log storage cluster identifier corresponding to the storage partition identifier comprises:

determining the log storage cluster identifier corresponding to the storage partition identifier based on the corresponding relationship stored in the writing node.

10. The electronic device according to claim 8, wherein the operations further comprise:

responding to the log query cluster receiving a query log request, wherein the query log request comprises filtering condition information;

querying an index list corresponding to the filtering condition information from a stored static sorted table file by the log query cluster, wherein the static sorted table file comprises a plurality of index lists; and acquiring the log information corresponding to the index list from the plurality of log storage clusters by the log query cluster.

11. The electronic device according to claim 10, wherein the filtering condition information comprises a search keyword and/or a data expiry date, and the operations further comprise:

querying the index list corresponding to the search keyword from the stored static sorted table file by the log query cluster; and/or, querying the index list corresponding to the data expiry date from the stored static sorted table file by the log query cluster.

12. The electronic device according to claim 10, wherein the distributed log storage system further comprises a compression cluster, and the cluster configuration information further comprises a preset keyname, the operations further comprise:

extracting the preset keyname from the log information by the compression cluster, and generating the index list corresponding to the log information according to the preset keyname; and merging the index list corresponding to a preset number of log information by the compression cluster to obtain the stored static sorted table file.

13. The electronic device according to claim 12, wherein the distributed log storage system further comprises a load balancing node, and the operations further comprise:

acquiring load information of each of a plurality of compressed nodes comprised in the compression cluster by the load balancing node, wherein the load information comprises the number of log information of the index list to be generated;

transferring the log information of the index list to be generated in the compressed node of which load information is greater than a first preset load to the compressed node of which load information is less than a second preset load by the load balancing node;

wherein the first preset load is greater than the second preset load.

14. The electronic device according to claim 8, wherein the plurality of log storage clusters are arranged in different device rooms, and of the device rooms is arranged with one or more log storage clusters.

15. A computer-readable storage medium, wherein the computer-readable storage medium stores a computer-executable instruction, and upon a processor executing the computer-executable instruction, the processor implements operations comprising:

receiving log information by any writing node among a plurality of writing nodes comprised in a log writing cluster of a distributed log storage system, wherein the distributed log storage system further comprises a plurality of log storage clusters, and each of the plurality of log storage clusters has a corresponding log storage cluster identifier;

acquiring a storage partition identifier in the log information by the writing node, wherein the writing node stores a corresponding relationship between storage partition identifiers and cluster configuration information, and the cluster configuration information comprises log storage cluster identifiers;

determining a log storage cluster identifier corresponding to the storage partition identifier by the writing node;

determining a target log storage cluster from the plurality of log storage clusters based on the log storage cluster identifier by the writing node; and writing the log information into the target log storage cluster.

16. The computer-readable storage medium according to claim 15, wherein the determining a log storage cluster identifier corresponding to the storage partition identifier comprises:

determining the log storage cluster identifier corresponding to the storage partition identifier based on the corresponding relationship stored in the writing node.

17. The computer-readable storage medium according to claim 15, wherein the operations further comprise:

responding to the log query cluster receiving a query log request, wherein the query log request comprises filtering condition information;

querying an index list corresponding to the filtering condition information from a stored static sorted table file by the log query cluster, wherein the static sorted table file comprises a plurality of index lists; and acquiring the log information corresponding to the index list from the plurality of log storage clusters by the log query cluster.

18. The computer-readable storage medium according to claim 17, wherein the filtering condition information comprises a search keyword and/or a data expiry date, and the operations further comprise:

querying the index list corresponding to the search keyword from the stored static sorted table file by the log query cluster; and/or, querying the index list corresponding to the data expiry date from the stored static sorted table file by the log query cluster.

19. The computer-readable storage medium according to claim 17, wherein the distributed log storage system further comprises a compression cluster, and the cluster configuration information further comprises a preset keyname, the operations further comprise:

extracting the preset keyname from the log information by the compression cluster, and generating the index list corresponding to the log information according to the preset keyname; and merging the index list corresponding to a preset number of log information by the compression cluster to obtain the stored static sorted table file.

20. The computer-readable storage medium according to claim 19, wherein distributed log storage system further comprises a load balancing node, and the operations further comprise:

acquiring load information of each of a plurality of compressed nodes comprised in the compression cluster by the load balancing node, wherein the load information comprises the number of log information of the index list to be generated;

transferring the log information of the index list to be generated in the compressed node of which load information is greater than a first preset load to the compressed node of which load information is less than a second preset load by the load balancing node;

wherein the first preset load is greater than the second preset load.

\* \* \* \* \*